United States Patent
Rager et al.

(10) Patent No.: US 7,063,262 B2
(45) Date of Patent: Jun. 20, 2006

(54) METHOD FOR PROVISIONING AND PRODUCT

(75) Inventors: Kent D. Rager, Grayslake, IL (US); Amitkumar N. Balar, Palatine, IL (US); Itzhak Mizrahi, Le-Zion (IL)

(73) Assignee: Motorola, Inc., Schaumburg, IL (US)

( * ) Notice: Subject to any disclaimer, the term of this patent is extended or adjusted under 35 U.S.C. 154(b) by 172 days.

(21) Appl. No.: 10/652,131

(22) Filed: Aug. 29, 2003

(65) Prior Publication Data
US 2005/0045717 A1   Mar. 3, 2005

(51) Int. Cl.
G06K 7/10 (2006.01)
(52) U.S. Cl. .................... 235/462.025; 235/462.001
(58) Field of Classification Search .......... 235/462.25, 235/462.26, 462.27, 462.28, 462.29, 462.01, 235/462.13
See application file for complete search history.

(56) References Cited

U.S. PATENT DOCUMENTS 5,606,160 A * 2/1997 Tani et al. .................. 235/475
6,011,880 A * 1/2000 Tani et al. .................. 382/312

* cited by examiner

Primary Examiner—Karl D. Frech
(74) Attorney, Agent, or Firm—Charles W. Bethards

(57) ABSTRACT

A method (300, 400) to provide for provisioning and a product. In one embodiment a processor (210) receives a pre-configured data image and writes it to a first area (221) of non-volatile memory (220) using, for example a first writing mode. Thereafter, for example after a power cycle the processor (210) determines whether an update to a second area of the non-volatile memory is required, and if so converts a first data item from the first area into a second data item uniquely associated with the product unit and writes the second data item in a second area (222) using a second writing mode.

25 Claims, 3 Drawing Sheets

METHOD FOR PROVISIONING AND PRODUCT

FIELD OF THE INVENTION

The present invention relates in general to the provisioning of the memory of consumer products, such as electronic devices, communications units or the like with software.

BACKGROUND OF THE INVENTION

During the manufacturing of relatively complex, software-driven consumer products such as communications units, mobile phones, subscriber devices, or the like, data must be loaded into the product to control operation and provide, for example, an operating software baseline and other data required for operation. Some data may be common to every phone produced by a manufacturer, such as the operating software, while other data, such as mobile service provider network, may be specific to one or a group of phones. Mobile service providers, for example, may require phones programmed with parameters associated with the service provider's particular network and thus groups of phones associated with the mobile service provider will have many of the same programming parameters.

In many mobile phone applications, features are already present in a phone and may be controlled, e.g. enabled and/or disabled, almost exclusively through software based on the services which an individual user or subscriber has paid for. In many service environments such as Global System for Mobile communications (GSM) environments, phone subsidies may be offered to customers by service providers to reduce or eliminate the cost of hardware in exchange for service subscriptions with the service provider offering the subsidy. Data is often stored with such subsidized phones to prevent activation or operation with a non-subsidy service provider.

Phone specific data often contains information that, in addition to being essential for proper operation of the phone in the service environment, may be tampered with or otherwise modified in order to gain free service or gain access to features that would ordinarily be unavailable.

Problems arise however in that loading software, e.g. provisioning a product can become time intensive within a production environment where slightly differing needs among different service providers or customers, network operators, hardware providers or the like must be addressed.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Figure 1:
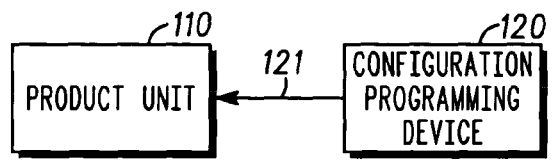
FIG. 1 is a block diagram depicting an exemplary embodiment of a product unit and a programming device arranged for rapid provisioning.

In overview, the present disclosure concerns consumer products, electronic devices such as communications units, and the like and a method and apparatus for rapid provisioning of such devices or consumer product units. Rapid provisioning may be provided from a programming device or fixture coupled to the product unit during a manufacturing process associated with the product unit, or alternatively memory devices may be pre-written in accordance with various exemplary and alternative exemplary embodiments prior to assembly within the product unit. Product units may further be rapidly provisioned in a service environment while performing software upgrades or when units are being reconfigured for different customers, including subscribers, wireless service providers, or the like. Product units may include wireless communications units often referred to as subscriber devices, such as cellular or mobile phones, two-way radios, messaging devices, personal digital assistant, personal assignment pads, and personal computers equipped for wireless operation, a cellular handset or device, or the like, or equivalents thereof provided such units are arranged and constructed for operation in accordance with the various inventive concepts and principles embodied in consumer products, systems, electronic devices or communications units, and methods for providing, initiating, or facilitating rapid provisioning of a product unit as discussed and described herein.

The principles and concepts discussed and described may be particularly applicable to units, devices, and systems providing or facilitating voice communications services or data or messaging services over wide area networks (WANs), such as conventional two way systems and devices, various cellular phone systems including analog and digital cellular, CDMA (code division multiple access) and variants thereof, GSM (Global System for Mobile communications), GPRS (General Packet Radio System), 2.5 G and 3G systems such as UMTS (Universal Mobile Telecommunication Service) systems, integrated digital enhanced networks and variants or evolutions thereof. Principles and concepts described herein may further be applied in devices or systems with short range communications capability normally referred to as W-LAN capabilities, such as IEEE 802.11, Bluetooth, or Hiper-LAN and the like that preferably utilize CDMA, frequency hopping, orthogonal frequency division multiplexing, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As described in greater detail hereinafter, various inventive principles are employed to provision a first area of a non-volatile memory area of a product unit in a rapid fashion with a data image containing data elements, some of which may be re-written in a secure fashion into a second area using a slower writing method. In one embodiment an image having a first data type is rapidly written to a first area of the non-volatile memory, the image including data elements that may be susceptible of being tampered with. Next such data elements that may be susceptible of being tampered with are written into a second area of the non-volatile memory, using techniques including an encoding process such as an encryption process and a slower writing process in accordance with various exemplary embodiments as will be described in greater detail. Accordingly data elements processed in such a manner and thus the product unit associated therewith, may be protected from tampering and may optionally be disabled, provided these principles or equivalents thereof are followed.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, a simplified and representative diagram of a product unit and programmer suitable for implementing exemplary methods of rapid provisioning will be discussed and described. In scenario 100, exemplary product unit 110, which, as described, may include a host of consumer products or electronic devices, such as communication units and the like, and configuration programming device 120, which may be a dedicated production or service device having, for example, a communication link to product unit 110 as the Device Under Test (DUT), a processor configured to be at least capable of remotely taking control of the DUT, loading software there within and otherwise having access to resources of the DUT, e.g. through access to address space within the DUT for data reading and writing and configuration as would be appreciated in the art. Alternately, programming device 120 may be an In Circuit Emulator (ICE) capable of taking control of the DUT as a replacement of the resident processor. As will be understood to one of skill in the art, programming device 120 may alternatively be a FLASH programmer and may be coupled to product unit 110 using communications interface 121 which may be, for example, a JTAG (Joint Test Access Group) adapter coupled through an IEEE 1149.1 interface or the like.

In accordance with various exemplary and alternative exemplary embodiments, programming device 120 may simply communicate to product unit 110 through a serial communications port associated therewith. Many factors can be determinative of which programming device 120 is best suited to be used, such as the degree of gain in programming speed desired in the production run associated with making and provisioning product unit 110. Another consideration may be the capabilities required of programming device 120 in terms of how many separate configuration images will be stored and loaded on the same model of product unit 110. The access speed of a non-volatile memory area associated with storage of the configuration image for product unit 110, may also be determinative of the optimal configuration of hardware and software associated with programming device 120. It will further be appreciated that the configuration image may be programmed or otherwise constructed on programming device 120 in advance of programming. The configuration image may even be copied from a prototype model of product unit 110. Regardless of how the configuration image is constructed, in accordance with alternative exemplary embodiments the configuration image may be FLASH programmed into a loose non-volatile memory part at an earlier stage in manufacturing, e.g. a sub-assembly stage, and the programmed part, e.g. the non-volatile memory, added to the final assembly, e.g. soldered in place within a circuit board associated with product unit 110, in a pre-programmed state.

Figure 2:
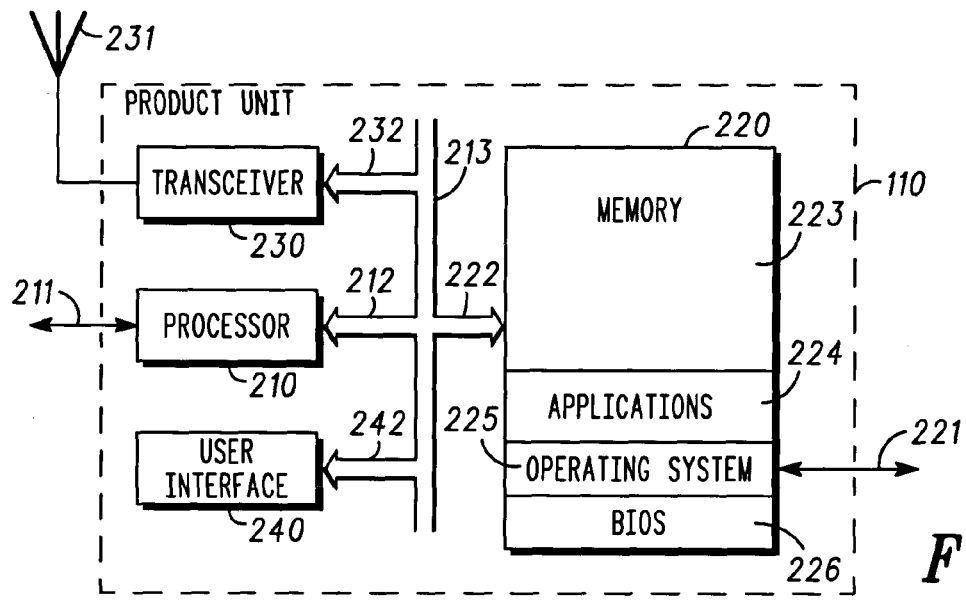
FIG. 2 is a block diagram depicting components of an exemplary product unit suitable for implementing rapid provisioning.

Referring to FIG. 2, a simplified block diagram of exemplary product unit 110 suitable for implementing exemplary methods of rapid provisioning will be discussed and described. As shown in exemplary scenario 200, product unit 110 may be embodied as a wireless communication unit and for example, includes various standard components thereof including but not limited to processor 210, which may be a conventional processor or a proprietary processor specially configured for application within product unit 110, memory 220 which may include RAM, EEPROM, etc. memory as would be known in the art, transceiver 230 which may be a module capable of transmitting and receiving signals using antenna 231 over an air interface, user interface 240 which may include a display, a keypad, function buttons and the like. In order to communicate information to product unit 110, e.g. for provisioning purposes, a communication link 211 can be provided to processor 210 as a way of establishing communications with, for example, a programming device such as programming device 120 or the like capable of loading a configuration image. Alternatively, memory 220 may be directly accessed through interface 221 to directly load memory 220 with various contents while outside product unit 110, for example, in sub-assembly manufacture. To facilitate data transfer within product unit 110 between memory 220 and various components, bus 213 can be provided and this can include control, address, and data busses connecting all addressable components of product unit 110. For example, transceiver 230 may be coupled to bus 213 via bus interface 232, processor 210 may be coupled to bus 213 via bus interface 212, and user interface 240 may be coupled to bus 213 via bus interface 242. It will be appreciated that, apart from the inventive concepts, modifications, and improvements disclosed herein, wireless communications units are generally known. Thus the known functions and structure of such devices will not be described in detail other than as related to the inventive principles and concepts disclosed and discussed below. Note also that the product unit 110 embodied in any one of a variety of devices or units discussed above may have access or be capable of having access to more than one network.

Figure 3:
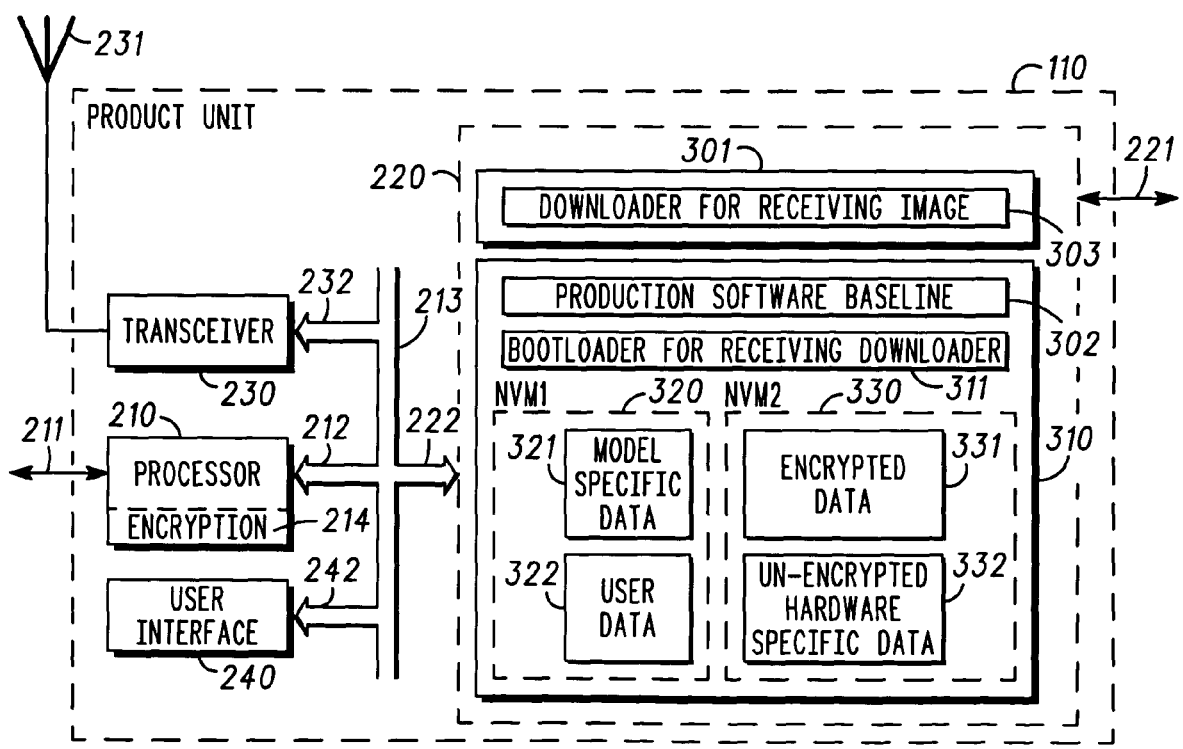
FIG. 3 is a block diagram further depicting components of an exemplary product unit including non-volatile memory areas suitable for implementing rapid provisioning.

Referring to FIG. 3 a more detailed block diagram of a preferred embodiment of an exemplary electronic device or product unit 110 will be discussed and described. As shown in exemplary scenario 300, product unit 110 may be arranged and constructed for rapid provisioning by way of a first area NVM1 320 and a second area NVM2 330 of non-volatile memory 310. Note that in some instances, the specific functionality of portions, functional blocks or elements of product unit 110 may depend on the particular access technology and other conventions used by the network providers. The specifics of transmission and reception and relevant processing are known and therefore any further discussions will be in generalities that are applicable to typical communications systems. However, data elements associated with, for example, the access network, enabled features, subsidies, user parameters and the like, to the extent such information may be used as a security element are of interest and will be described in greater detail in connection with various exemplary embodiments.

Product unit 110 can be coupled to, for example, a programming device such as programming device 120 as previously described, via a link or communications interface 211 between the programming device and processor 210. As noted, programming device 120 may be a dedicated production device or fixture associated with programming a large number of product unit 110 in a rapid fashion or may be an ICE or a JTAG programmer or other programming device as would be known in the art. The programming device may take control of product unit 110 and load a configuration image in rapid fashion, e.g. through a FLASH writing process, the configuration image containing elements destined initially for NVM1 320 and optionally including a production software baseline 302, e.g. for operating product unit 110. In some embodiments, a programming device may first load a "downloader" program into memory 220, e.g. in area 303 of RAM 301 which then controls the transfer of configuration image data to a range of specified memory addresses, e.g. associated with NVM1 320. It should be noted that to facilitate loading of the downloader program, a bootloader 311 can be loaded and permanently stored in non-volatile memory 310 to initially load the downloader program into area 303 of RAM 301, e.g. within memory 220. RAM 301 may further be used in a normal fashion during operation, e.g. for run-time uses. Optionally, as noted, a production software baseline or the like may be loaded with the image and stored in NVM 310, for example, in area 302 of NVM 310. Otherwise it will be appreciated that operating software may reside either within NVM1 320 or may reside in a separate area of memory 220 such as a ROM area or the like along with, for example, application 224, operating system 225, BIOS 226, and the like.

It can be seen that NVM1 320 can contain model specific data 321, e.g. configuration parameters common to the model associated with product unit 110 and user data initialized to a factory default state during production such as phone number or the like. Non-volatile memory 310 may further be configured with a second area: NVM2 330, for containing device specific data in the form of data or tuning data specific to the particular hardware used to construct product unit 110 such as transceiver coefficients and other parameters which address, for example, unique tolerances specific to the individual hardware components used in the particular instance of product unit 110. NVM2 may further contain device specific data in the form of encrypted data 331 which, using a unique encryption key stored in a manner which prevents reading of the actual key even by the processor, for example, within encryption circuit 214 of processor 210, may be created and stored to be uniquely associated with product unit 110. Some device unique or specific data, such as the tuning data, can be stored in NVM2 330 prior to flashing the device or memory as described herein.

Figure 4:
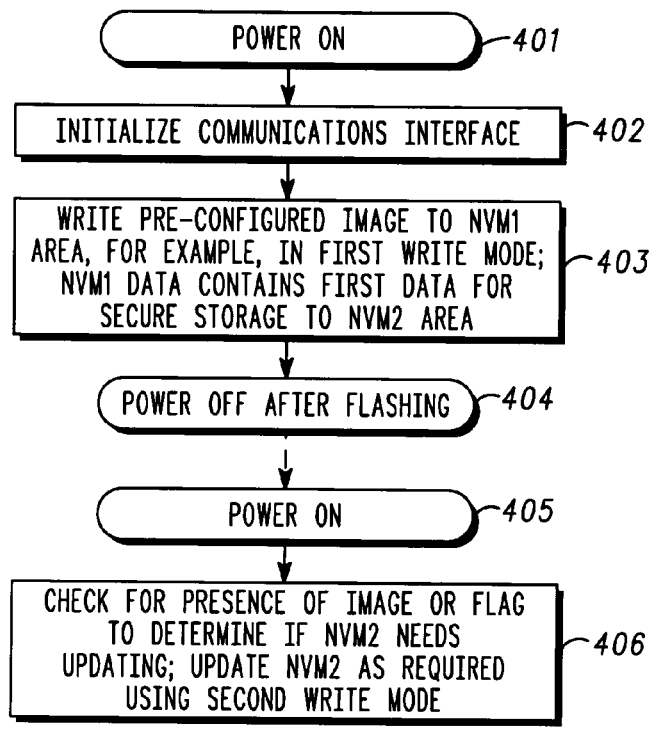
FIG. 4 is a flow chart depicting an exemplary embodiment of a method for providing rapid provisioning to a product unit.

To better understand the inventive concepts and principles embodied herein, reference will be made to FIG. 4 wherein a flow chart of an exemplary method will be described and discussed. Method 400 will be described in the context of the apparatus of FIG. 1 through FIG. 3 but it should be understood that the method may be practiced by other and similar apparatus. Method 400 begins at 401 with a power-up of product unit 110 and an initialization of communication interface 211 at 402. Since, during production, processor 210 contains no application code, at initialization, processor 210 will be in a wait, or standby state at which time a pre-configured image containing the software configuration may be loaded 403 into NVM 310 and NVM1 320.

One approach to loading the configuration image includes issuing a "TEST" command on communications interface 211 whereupon the processor will be ready to receive data at a specified address or address range. A programming device coupled to processor 210 over communications interface 211 may further load a "downloader" program which can be resident in either a RAM area associated with processor 210 or a resident RAM device associated with product unit 110, such as RAM 301 of memory 220, to facilitate the rapid writing of the configuration image thereto. Thus using a downloader, a configuration image can be rapidly flash written to NVM1 320 including first data elements, which, because of their relevance to tamper resistance, may also be referred to as security elements. Then at 404 after the flash writing procedure the unit is powered off.

The next time the unit is powered on 405, in one embodiment a flag can be checked, as will be described in greater detail hereinafter, to determine whether NVM2 330 requires updating 406, e.g. updating of the security elements stored therein, however it will be appreciated that the presence of the configuration image within NVM1 320 can act as a flag. If NVM2 330 needs updating, e.g. the security elements that are desired do not match those presently stored or perhaps none are stored in NVM2 330, and the flag is set, then the security elements, e.g. first data elements, are converted to second data elements, for example through an encryption process and may further be written to NVM2 330 in a second writing mode, e.g. a "flex" writing mode. Note that detecting the presence of the image or relevant portion thereof, or the like, within NVM1 320 can serve as the flag, thus indicating that NVM2 330 needs to be updated. This situation may arise for the initial in-production writing or flashing of NVM1 320.

Flex writing may be distinguished from the more rapid writing associated with flash writing in that flex writing involves issuing a write command associated with a particular data element to product unit 110 which is then written in a manner similar to standard file writing as would be known in the art. Flex writing in accordance with various exemplary embodiments preferably uses a file manager, such as Intel® Flash Data Integrator (Intel® FDI) to manage code, data, and files in a flash memory, e.g. NVM 1 320 and NVM 2 330. Through the use of an Application Program Interface (API) FDI supports storage of numerically identified data parameters, data streams for voice recordings and multimedia, Java applets and native code for direct execution, and ANSI-style files. FDI further has a background manager to handle power-loss recovery and wear-leveling of flash data blocks to increase cycling endurance.

In a typical flash memory, all bits are set to a logic one when the part is in an "erased" state and data writing may be performed by setting appropriate bits to zero.

Erasing, as noted, involves setting all bits back to one and is preferably done on a page basis, where page sizes are large, e.g. 64K or 128K pages, relative to, for example, encrypted security elements. In order to write to an area, the page must be erased then written to in its entirety. In a flex writing scenario, a relatively small amount of data, say several bytes associated with, for example, an encoded security data element plus a pointer can be written through the FDI or like interface, somewhere within an entire page of NVM2 330. As data is written and erased, the FDI or like file manager must maintain a growing list of pointers to the "fresh" areas of NVM2 330, e.g. fresh areas being those areas that can still be written to. When a page has been filled through exhaustion of space within NVM2 330 due to the indirect writing techniques described, data must be consolidated, temporarily stored, such as in a separate page of NVM2 330 and the exhausted page of NVM2 must be erased in order to support new write operations. The consolidated data may then be written back to NVM2 330.

Thus when large amounts of data are being written, the flash writing mode can be much faster than using the flex writing mode for the same amount of data, particularly when a large number of product units need to be provisioned. However it will be appreciated that by flash writing large blocks of data and flex writing other data requiring flex writing, net gains or improvements in per unit programming time may be experienced, even with the significant time penalties of flex writing. Security elements may thus be written using flex writing in accordance with various exemplary embodiments described herein.

It will be further appreciated that in accordance with known product unit programming or provisioning scenarios, only a software baseline is flash programmed, for example, into NVM1 320. All customer-specific parameters are written in a flex writing mode into NVM1 320, with security related parameters being flexed into NVM2 330, taking up to 30 minutes per unit. In one exemplary scenario for reducing programming time, a software baseline plus an image of customer specific data may be flashed into NVM1 320, then a small flex write of NVM2 330 can be performed with just security related parameters. Such an approach while improving over the conventional approach, however could still pose problems in that two files must be maintained at the production level having customer specific information split there between unlike the conventional or known approach that, while using two files, consolidated all customer specific data in a single file. It can be appreciated that errors may easily be introduced by file mix-ups, e.g. a flash file from customer A and a flex file from customer B. In accordance with various exemplary embodiments described herein, all information can be contained in a single file for record purposes and the like, e.g. a flash file or image that is flash written for provisioning purposes.

Thus, in accordance with various exemplary embodiments described herein, parameters are flashed into a first area of non-volatile memory in a time on the order of several tens of seconds, by device 120 in a production process and then the product unit 110 is powered off. Re-powering the product unit 110 at 405 invokes a process within the product unit 10 whereby security parameters included with the image are flex written in an encrypted mode to a second area of non-volatile memory. Even though the flex writing process is slower due to pointer management by a file manager or FDI process an the like, it can be carried out by the product unit 110 on a per-unit basis once flash writing of all the product parameters has been completed. As will be discussed further below this is particularly advantageous when a unit specific encryption key is used and especially so if the key is not easily obtained.

The data element may further be encoded or encrypted using, for example, 128-bit DES (Data Encryption Standard) encryption using a unique 128-bit encryption key stored in product unit 110 in, for example, encryption circuit 214. Note that the result of this encryption is data or a second date element that is unique for each product unit. It will be appreciated that the encryption circuit 214 in certain embodiments is permanently configured with an encryption key in a manner such that the actual value of the key cannot be accessed by anyone including processor 210, or can not be modified or otherwise tampered with. Data to be encrypted is input to the encryption circuit 214 which may include, for example, the calculation and addition of a CRC value to form an intermediate value including a first data element and a CRC appended thereto. A key or encryption key, such as a 128-bit DES key can be used to encrypt the intermediate value which is output therefrom as encoded or encrypted second data element whereupon it can be stored, for example, in NVM2 330. When decrypting using encryption circuit 214, the encrypted second data is decrypted using the 128-bit DES key to the intermediate value, a CRC is generated on the contents representing the first data element and compared with the decrypted CRC that was appended. If the values do not match, an error can be detected, which could be strongly indicative of tampering. Once flash writing of NVM1 320 has been accomplished power can be removed and upon re-powering of product unit 110, flex writing of NVM2 330 can be accomplished if necessary. The product unit 110 is then operated in a normal fashion.

Figure 5:
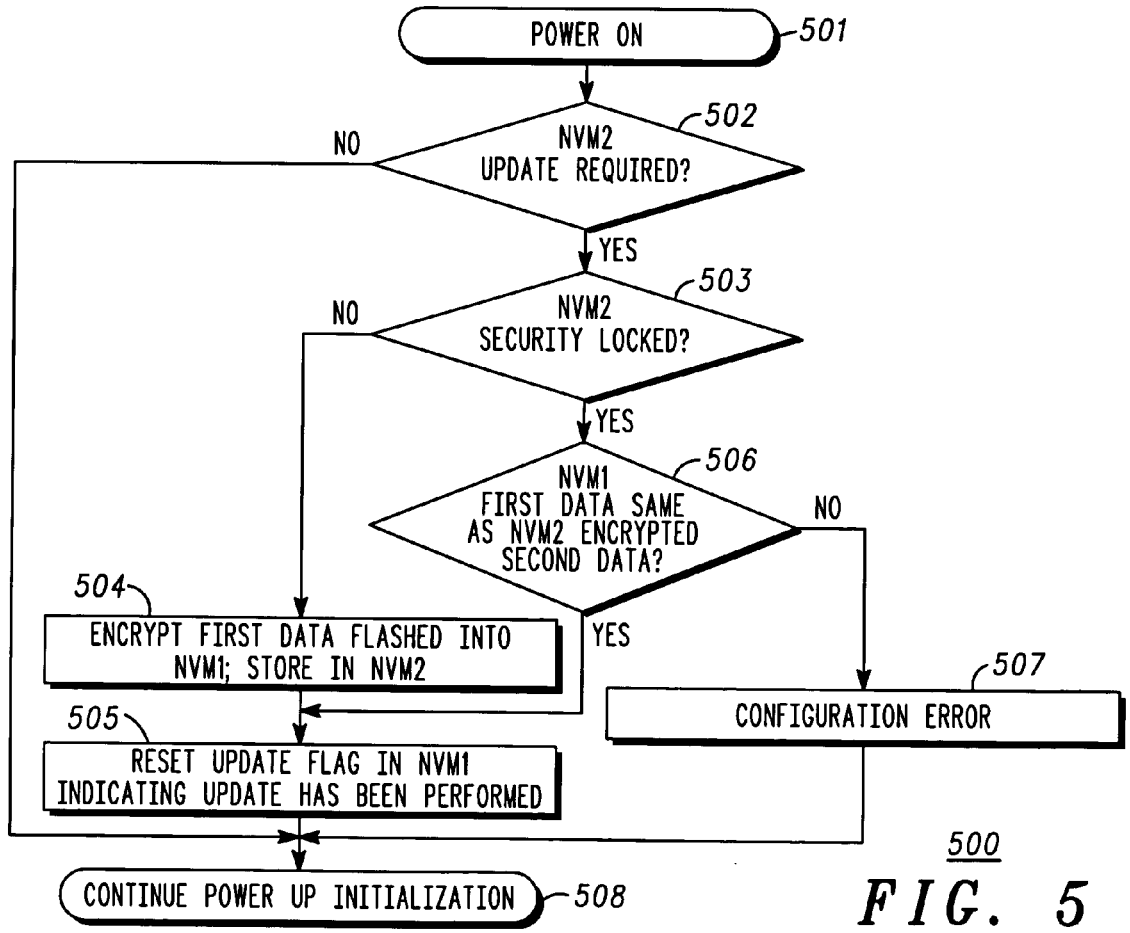
FIG. 5 is a flow chart further depicting an exemplary embodiment of a method for providing rapid provisioning to a product unit.

Reference will now be made to FIG. 5 wherein a more detailed flow chart of an exemplary method will be described and discussed. Method 500 begins at 501 with a power-up of product unit 110. At 502, a test is made to determine whether an update to NVM2 330 is required. If so, a test may be made at 503 to determine whether in accordance with various locking procedures, product unit 110 is security locked, e.g. simlocked, subsidy locked, or the like.

It will be appreciated by those skilled in the art that locking is a tamper prevention mechanism to permanently or semipermanently "lock" the operation of the phone to certain features or other programmed parameters which have been purchased or are otherwise part of a user's service agreement with, for example, a particular network operator or service provider. A product may be SIM-locked whereby product unit 110, such as a communications unit or mobile phone is locked to a particular SIM card. If product unit 110 is simlocked to a SIM no other SIM may be used or alternatively, only SIMs from a particular service provider or network operator may be used in the phone. SIM-lock may also be referred to as product lock, feature lock, subscription lock, subsidy lock, service provider (SP) lock or network lock. In the case of a network, SP lock, operator lock or the like, product unit 110 is locked to an operator, thus any SIM from the operator may be used therein, e.g. when switching between various service contracts and prepaid calling as desired. However, a switch may not be made to a different operator since a foreign SIM associated with the new operator would not be useable, e.g. due to the lock. Product 110 may further be locked to a code, which code could be used in a variety of locking scenarios whereby a code may be requested and entered to gain access to certain lock related operations. Once NVM2 330 is written, a subsequent failure in matching lock parameters may indicate that a foreign SIM has been inserted into product unit 110, and operations may be inhibited unless, for example, an unlock password is entered. In accordance with various exemplary embodiments described herein, security related data elements may further be checked for tampering if contents from NVM2 330, specifically encrypted data 331 do not decrypt in a proper fashion. Failure to decrypt will preferably result in disabling of product unit 110 since a decryption failure indicates tampering.

Problems arise however in that SIM-lock may be removed allowing any SIM card, depending on phone model, to be inserted therein to allow the phone to be used in a different operating environment or foreign networks and in some cases free of charges. Such breaking of simlock is particularly troublesome where one service provider subsidizes all or part of a phone's cost only to have the customer break the simlock or subsidy lock and use the phone in a different network associated with another service provider, e.g. one with a cheaper service plan rate. In such subsidy offerings, the cost of the phone is generally offset by various charges accrued over the life of the plan. If a subsidized phone is tampered with and used in a different service environment, not only is the cost of the phone lost but the revenues from the service plan are lost as well. Thus various exemplary embodiments of inventive concepts described herein may be used to prevent tampering with simlocked parameters thus adding an additional or alternative layer of tamper protection by encrypting the lock parameters with a device specific, 128-bit encryption key, located in an unreadable manner in encryption circuit 214 of processor 210 as described herein above and storing them in area 331 of NVM2 330.

In accordance with various alternative exemplary embodiments, a scenario can be envisioned whereby a product unit 110 is manufactured and provisioned with an extensive portfolio of resident features including, for example, basic features which can be enabled during production, and additional features which may be arranged as feature tiers or individual features to be purchased and configured at a point of sale or distribution. It should be noted that in a minor departure from the concepts described herein, an update flag may be stored in a pending status such that it is not cleared until the final feature set is determined at the point of sale or distribution. In such a way, the generic model of product unit 110 may be generously stocked as a single model with features being enabled depending on the requirements of the customer and willingness of the customer to pay the price for the additional features. In such a scenario, a fixture or programming device 120 located at the point of sale may be used to enable the features, and set a flag indicating that, for example, NVM2 330 requires an update. The feature data may be arranged, encrypted and written as security elements to NVM 2 330 in a manner as previously described and to be described in greater detail hereinafter. Product unit 110 may then, as a final measure be locked and further writing prevented, and the update status may be reset to updated, e.g. no update required.

Returning to FIG. 5, if test 503 determines that product unit 110 and thus, for example, NVM2 330 is not security locked, then first data elements, included, for example, with a configuration image rapidly flash written into NVM1 320 in accordance with an earlier process, may be converted 504 into second data elements and stored in NVM2 330. Upon the first re-powering after flashing or otherwise modifying NVM1 is an manner that needs to be reflected in NVM2, first data elements may be converted, e.g. encrypted in the manner described herein above, using the 128-bit key in encryption circuit 214 and a 128-bit DES algorithm stored, for example, in encryption circuit 214 or a different area of the non-volatile memory and run on processor 210, or stored and run on programming device 120, or the like. In either case, the 128-bit encryption key associated with encryption circuit 214 is preferably unique to product unit 110 and thus will be used in any conversion or encryption step regardless of whether performed using processor 210 or an external processor or programming device. In accordance with preferred exemplary embodiments, encryption circuit 214 may be embodied as a cell within processor 210, which itself may be a dedicated, proprietary, or custom processor, IC, ASIC, or the like as would be appreciated by one of ordinary skill in the art. Further it will be appreciated that the encryption circuit may alternatively be an encoder or may use a different kind of encryption, preferably with no or limited access to the key, where the resulting data is tied specifically to product unit 110, either by using, for example, the serial number or other unique and device-specific identifier in the encoding or encryption process. After conversion, converted or encrypted first data elements may be stored into area 331 of NVM2 330 using flex writing as described above, which is a slower writing process. It will be appreciated that encryption may be incorporated as part of the flex writing process or may be an intermediate step without departing from the scope of the disclosure. Once NVM2 330 has been updated, an update flag may be reset at 505 to reflect that the contents of NVM2 330 now reflect the present security parameters, or alternatively the configuration image, e.g. the contents of NVM1 320 may be erased or the like, and the power-up initialization may proceed at 508.

If, however, test 503 determines that product unit 110 is security locked, then a second test may be made at 506 to determine whether the encrypted contents of NVM2 330 are valid, e.g. the same as the first data elements previously written to NVM1 320, using, for example, a decryption process described herein after. If the elements are the same, then the update flag can be reset in 505, or alternatively NVM1 320 may be erased, indicating that an update is not necessary. If the elements are not the same, then a configuration error is present at 507 and product unit 110 may be inoperative until, for example, a unlock password is entered, or alternatively, product unit 110 may be permanently disabled if tampering is detected.

Figure 6:
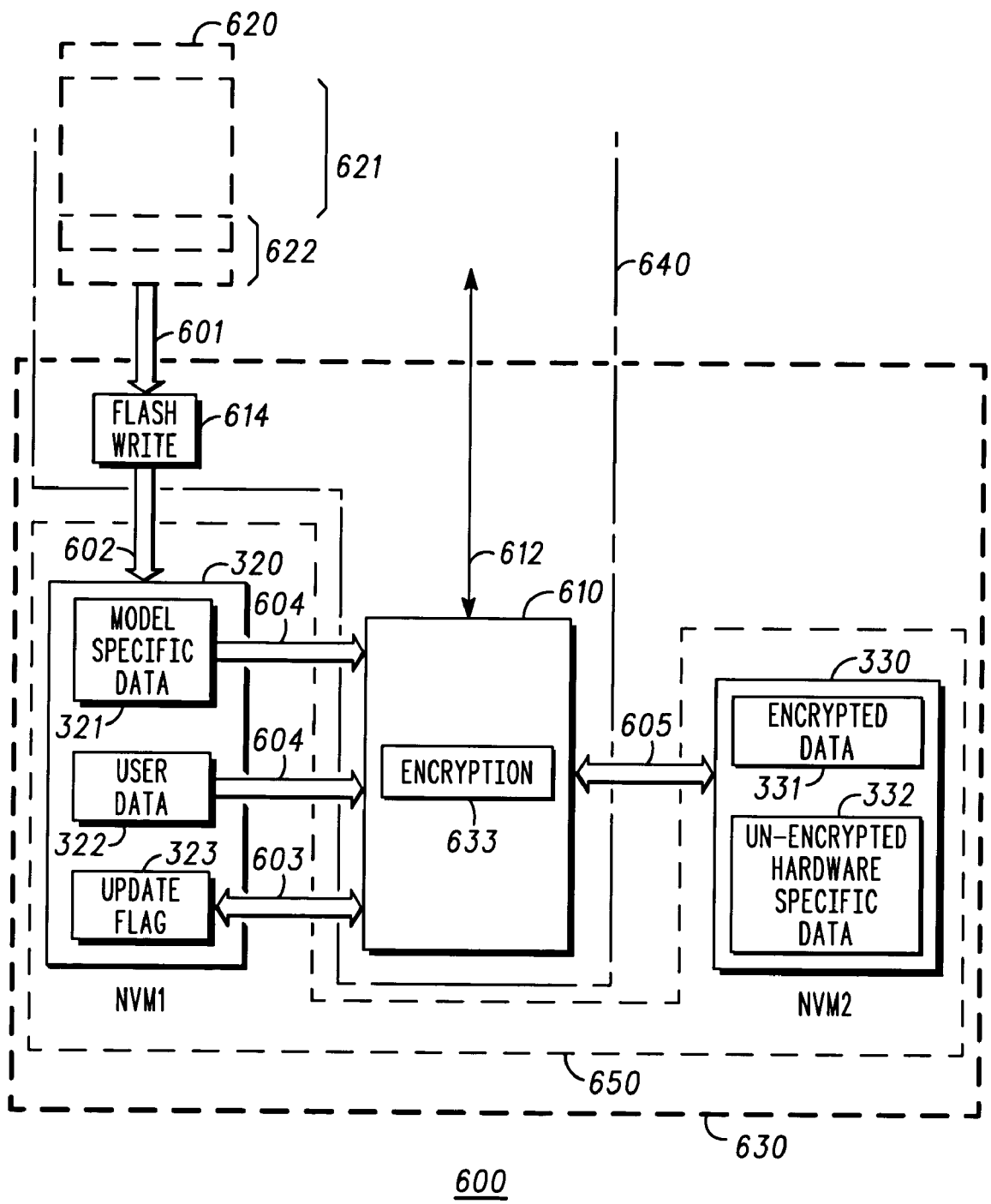
FIG. 6 is a diagram further depicting an exemplary embodiment of a method for providing rapid provisioning to a product unit.

A more detailed view of an exemplary embodiment shown in FIG. 6 will now be described and discussed. In scenario 600, while several alternate groupings, e.g. 630, 640, and 650 are shown for carrying out exemplary functions associated with rapid provisioning of product unit 110, specifically NVM1 320 and NVM2 330 thereof, the process is virtually the same. As shown, for example in grouping 630, processor 610 and flash write process 614 may be resident together with NVM1 320 and NVM2 330 within, for example, product unit 110 while linked to, for example, a programming device through communications link 612. Alternatively, as shown in alternate grouping 640, processor 610 and flash write process may reside together outside product unit 110 within, say, a programming device such as an ICE or dedicated jig or fixture as described above, and may remotely gain control of product unit 110 for flash writing of NVM 1 320 and flex writing of NVM 2 330 in the manner previously described. Still further, alternate grouping 650, may represent a non-volatile memory device including NVM 1 320 and NVM 2 330 programmed independently of product unit 110 and then assembled into product unit 110 fully programmed using an external programming device having, for example, at least processor 610 and flash writing process 614.

Thus in accordance with any of the above alternative groupings, configuration image 620 may be constructed on an external programming fixture by piecing together various binary representations of software and data required to form a complete software baseline including security elements. It will be appreciated in the art that the construction of configuration image 620 may be accomplished in a multitude of ways including copying an image from the non-volatile memory of another product of the same model and with the identical parameters as those desired for product unit 110. In any case, it should be noted that configuration image 620 may preferably contain area 621 for non-security related data such as software baseline, model specific data, user data and the like, while area 622 of configuration image 620 may contain security related data elements or first data elements. Alternatively, first data elements may be located at various places within configuration image 620 requiring a degree of intelligence in the writing process, e.g. to know which elements should be encrypted to prevent tampering and the location of such elements within configuration image 620 and eventually NVM1 320. In a first part 601 of a process of rapid provisioning, configuration image may be loaded into a memory area associated with a flash writing process 614. Such an area may be a RAM area located within product unit 110 or processor 210 or 610 or may be otherwise accessible for storage of all or part of configuration image 620 for the purposes of performing flash writing thereof. In second part 602, configuration image 620 may be flash written to NVM1 320 to include model specific data 321, user data 322 and an update flag 323, alternately, the presence of configuration image 620 as written to NVM1 320 may serve as a flag or be indicative of the need for an update. In a third part 603, update flag 323 or, alternatively, the presence of configuration image 620 and/or the contents thereof, may be checked to determine whether an update is required which in the case of a production state provisioning, will almost certainly be set to show that updating is required. One instance, which could be envisioned where an update would not be necessary, would be a flash write of the software baseline only; security elements should not be affected thereby. Upon determining that an update is required in 603, a fourth part may be performed in 604, which may be considered as an intermediate step involving the reading of security elements or first data elements from NVM 1 320, converting the first data elements by encrypting them in encryption circuit 633 to form second data elements, and flex writing the second data elements in 605 to area 331 of NVM 2. Note that the writing to NVM 2 area 330 is ordinarily accomplished, for example, with the first power on cycle of the product unit after the flash writing or other modification to NVM 1 320.

The apparatus, processes, and systems discussed above and the inventive principles thereof are intended to and can alleviate problems, such as tampering, and programming delays caused by present approaches to provisioning product units as well as offer a novel and advantageous methodology for rapid provisioning and tamper resistance/detection. Using the principles of, for example, reading first data elements such as security elements from a first area of a non-volatile memory, converting the first data elements using, for example, 128-bit DES encryption to second data elements, and writing the second data elements to a second area of non-volatile memory will facilitate a cost effective, efficient, and flexible means for provisioning and tamper proofing product units which otherwise are delayed in production by lengthy programming procedures and which remain vulnerable to tampering to defeat service agreements and avoid charges.

Furthermore the concepts and principles disclosed and discussed for rapid provisioning will provide enhanced security since a potential hacker or tamperer while possibly being able to change data in one area of non-volatile memory, will be defeated by the presence of an encrypted version of security data in a second area of non-volatile memory. As will be appreciated in view of the exemplary encryption methods described herein, decryption may be performed by running a decryption or reverse encryption process on the contents of a secure storage area of non-volatile memory using an embedded key, which is preferably not capable of being known. The decrypted contents preferably include a data item plus an appended CRC. A new CRC may be generated on the decrypted data item to generate a new CRC which should match the decrypted CRC. If the CRC values match, it can be presumed that the data item has not been tampered with. If the CRC values do not match, then it can be presumed that an error has occurred or that the data item has been tampered with.

In accordance with an alternative exemplary embodiment, improper reconciliation between the encrypted security data stored, for example, in one area of non-volatile memory and first data stored in another area of non-volatile memory may be used to permanently or semi-permanently inhibit further functioning of the product unit. It is expected that one of ordinary skill given the above described principles, concepts, and examples will be able to implement other alternative procedures offering rapid provisioning and tamper resistance of product units. It is anticipated that the claims below cover many such other examples.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for provisioning a product unit having a non-volatile storage medium, the method comprising:
   reading at least a first data item of a pre-configured data image from a first area of the non-volatile storage medium;
   converting the at least first data item to form a second data item uniquely associated with the product unit; and storing the second data item to a second area of the non-volatile storage medium using a first writing mode to control functionality of the product unit.

2. A method according to claim 1, further comprising writing the pre-configured data image to the first area of the non-volatile storage medium using a second writing mode.

3. A method according to claim 2, wherein the first writing mode is slower than the second writing mode.

4. A method according to claim 2, wherein the second writing mode includes a flash writing mode wherein the pre-configured data image is written therewith.

5. A method according to claim 1, further comprising setting a flag associated with the pre-configured data image and stored in the first area to a value indicating that an update of the second data item into the second area has been performed and storing the updated flag in the first area.

6. A method according to claim 1, further comprising checking a state of a flag associated with the pre-configured data image and stored in the first area to determine whether an update of the encoded second data item into the second area has been performed.

7. A method according to claim 6, wherein the checking the state is performed prior to the converting and the converting is performed only if the checking determines that the update has not been performed.

8. A method according to claim 1, wherein the first writing mode includes a flex writing mode.

9. A method according to claim 1, wherein the converting further includes: encrypting the first data item to form an encrypted second data item.

10. A method according to claim 1, wherein the at least first data item includes one of: one or more network parameters, one or more subsidy parameters, one or more service provider parameters, one or more feature parameters, and one or more code parameters.

11. A method for provisioning a product unit having a non-volatile storage medium, the method comprising:
    reading a flag in a first area of the non-volatile storage medium to determine whether an update of a second area of the non-volatile storage medium has been performed; and
    converting, if the update has not been performed, a first data item from the first area into a second data item uniquely associated with the product unit and writing the second data item in the second area of the non-volatile storage medium using a second writing mode.

12. A method according to claim 11, wherein the first area of the non-volatile storage medium is written with a pre-configured data image using a first writing mode, the pre-configured data image containing at least the first data item and the flag.

13. A method according to claim 11, further including setting the flag to a value indicating that an update of the second data item into the second area has been performed.

14. A method according to claim 11, wherein the first writing mode is faster than the second writing mode.

15. A method according to claim 11, wherein the first writing mode includes a flash writing mode wherein the entire pre-configured data image is written therewith.

16. A method according to claim 11, wherein the second writing mode includes a flex writing mode.

17. A method according to claim 11, wherein the converting further includes:
    generating an intermediate value associated with the first data item, the intermediate value including the first data item and a first appended value; and
    encrypting the intermediate value to form the second data item.

18. A product unit arranged and constructed for provisioning, the product unit comprising:
    a processor; and
    a non-volatile memory coupled to the processor, the non-volatile memory having a first area and a second area, the processor configured to:
        check a flag associated with a pre-configured data image stored in the first area to determine whether an update to the second area of the non-volatile memory is required, and
        when an update is required, convert a first data item from the first area into a second data item uniquely associated with the product unit and write the second data item in the second area of the non-volatile storage using a second writing mode.

19. A product unit according to claim 18, wherein the processor is further configured to: receive the preconfigured data image and write the pre-configured data image to the first area of the non-volatile memory using a first writing mode.

20. A product unit according to claim 19, wherein the first writing mode is faster than the second writing mode.

21. A product unit according to claim 18, wherein the processor is further configured to set the flag to a value indicating that an update of the second area has been performed.

22. A product unit according to claim 18, wherein a first writing mode includes a flash writing mode wherein the pre-configured data image is written to the first area.

23. A product unit according to claim 18, wherein the second writing mode includes a flex writing mode.

24. A product unit according to claim 18, further comprising an encryption circuit uniquely associated wit the product unit, and wherein the processor, in converting, is further configured to encrypt the first data item with the encryption circuit to form the second data item.

25. The product unit of claim 24 further comprising a wireless communications unit wherein the encryption circuit is further utilized to decrypt the second data item to facilitate detecting tampering of the second data item.

* * * * *

UNITED STATES PATENT AND TRADEMARK OFFICE
CERTIFICATE OF CORRECTION

| | | |
|---|---|---|
| PATENT NO. | : 7,063,262 B2 | Page 1 of 1 |
| APPLICATION NO. | : 10/652131 | |
| DATED | : June 20, 2006 | |
| INVENTOR(S) | : Rager et al. | |

It is certified that error appears in the above-identified patent and that said Letters Patent is hereby corrected as shown below:

Column 14 line 47 please delete "wit" and insert --with--.

Signed and Sealed this

Twelfth Day of September, 2006

JON W. DUDAS
*Director of the United States Patent and Trademark Office*